United States Patent
Sandorfi et al.

(10) Patent No.: US 8,200,924 B2
(45) Date of Patent: Jun. 12, 2012

(54) EMULATED STORAGE SYSTEM

(75) Inventors: Miklos Sandorfi, Northborough, MA (US); Timmie G. Reiter, Westborough, MA (US)

(73) Assignee: Sepaton, Inc., Marlborough, MA (US)

( * ) Notice: Subject to any disclaimer, the term of this patent is extended or adjusted under 35 U.S.C. 154(b) by 432 days.

(21) Appl. No.: 12/350,805

(22) Filed: Jan. 8, 2009

(65) Prior Publication Data

US 2009/0177661 A1    Jul. 9, 2009

Related U.S. Application Data

(63) Continuation of application No. 12/176,308, filed on Jul. 18, 2008, which is a continuation of application No. 11/593,266, filed on Nov. 6, 2006, now Pat. No. 7,430,647, which is a continuation of application No. 10/911,987, filed on Aug. 5, 2004, now Pat. No. 7,146,476.

(60) Provisional application No. 60/492,576, filed on Aug. 5, 2003, provisional application No. 60/492,827, filed on Aug. 6, 2003.

(51) Int. Cl.
*G06F 12/00* (2006.01)

(52) U.S. Cl. .................. 711/162; 711/156; 711/E12.008

(58) Field of Classification Search .................. 711/162, 711/112, 114, 156, E12.008; 714/6; 707/204, 707/1

See application file for complete search history.

(56) References Cited

U.S. PATENT DOCUMENTS

| | | | |
|---|---|---|---|
| 5,226,141 A | 7/1993 | Esbensen | |
| 5,276,860 A | 1/1994 | Fortier et al. | |
| 5,276,867 A | 1/1994 | Kenley et al. | |
| 5,403,639 A | 4/1995 | Belsan et al. | |
| 5,454,098 A | 9/1995 | Pisello et al. | |
| 5,990,810 A | 11/1999 | Williams | |
| 5,991,862 A | 11/1999 | Ruane | |
| 6,070,224 A | 5/2000 | LeCrone et al. | |
| 6,098,148 A | 8/2000 | Carlson | |
| 6,230,190 B1 | 5/2001 | Edmonds et al. | |

(Continued)

FOREIGN PATENT DOCUMENTS

CN    1092886    9/1994

(Continued)

OTHER PUBLICATIONS

Time Navigator—Backup, archiving and restoration software Nov. 10, 2000, http://www.icewalkers.com/Linux/Software/512830/Time-Navigator.html (retrieved Oct. 20, 2009)—printed Dec. 4, 2009.

(Continued)

*Primary Examiner* — Pierre-Michel Bataille
(74) *Attorney, Agent, or Firm* — Proskauer Rose LLP

(57) ABSTRACT

Systems and methods for efficient storage of data are provided. For instance, a method that includes acts of receiving a data stream to be stored on a first storage system, the data stream comprising a data object and metadata that describes attributes of the data object, extracting the metadata from the data stream, storing the data object on the first storage system and storing the extracted metadata, separately from the data object, on a computer-readable medium is disclosed. Additionally, a storage system is disclosed that includes a first storage medium, an interface configured to receive a data stream including a data object to be stored on the first storage medium and a controller. The controller may be configured to extract metadata from the data stream, the metadata being descriptive of attributes of the data object, and to direct the extracted metadata to be stored on a computer-readable medium.

39 Claims, 10 Drawing Sheets

U.S. PATENT DOCUMENTS

| | | | |
|---|---|---|---|
| 6,247,024 B1 | 6/2001 | Kincaid | |
| 6,317,814 B1 | 11/2001 | Blendermann et al. | |
| 6,366,986 B1 | 4/2002 | St. Pierre et al. | |
| 6,366,987 B1 | 4/2002 | Tzelnic et al. | |
| 6,385,706 B1 | 5/2002 | Ofek et al. | |
| 6,542,906 B2 | 4/2003 | Korn | |
| 6,714,952 B2 | 3/2004 | Dunham et al. | |
| 6,715,098 B2 | 3/2004 | Chen et al. | |
| 6,718,352 B1 | 4/2004 | Dang et al. | |
| 6,779,095 B2 | 8/2004 | Selkirk et al. | |
| 6,829,617 B2 | 12/2004 | Sawdon et al. | |
| 6,834,324 B1 * | 12/2004 | Wood | 711/111 |
| 6,957,291 B2 * | 10/2005 | Moon et al. | 714/6.2 |
| 7,024,427 B2 | 4/2006 | Bobbitt et al. | |
| 7,055,008 B2 | 5/2006 | Niles et al. | |
| 7,058,788 B2 | 6/2006 | Niles et al. | |
| 7,093,127 B2 | 8/2006 | McNulty | |
| 7,120,631 B1 | 10/2006 | Vahalia et al. | |
| 7,146,476 B2 | 12/2006 | Sandorfi et al. | |
| 7,155,585 B2 | 12/2006 | Lam et al. | |
| 7,165,145 B2 | 1/2007 | Lam | |
| 7,216,135 B2 | 5/2007 | Sawdon et al. | |
| 7,430,647 B2 | 9/2008 | Sandorfi et al. | |
| 2002/0059505 A1 | 5/2002 | St. Pierre et al. | |
| 2002/0091710 A1 | 7/2002 | Dunham et al. | |
| 2002/0124137 A1 | 9/2002 | Ulrich et al. | |
| 2003/0028718 A1 | 2/2003 | Blendermann et al. | |
| 2003/0074378 A1 | 4/2003 | Midgley et al. | |
| 2003/0105912 A1 | 6/2003 | Noren | |
| 2003/0135514 A1 | 7/2003 | Patel et al. | |
| 2003/0145180 A1 | 7/2003 | McNeil | |
| 2003/0145248 A1 | 7/2003 | McNeil | |
| 2003/0158831 A1 | 8/2003 | Zaremba | |
| 2003/0177149 A1 | 9/2003 | Coombs | |
| 2003/0221076 A1 | 11/2003 | Milligan et al. | |
| 2003/0225800 A1 | 12/2003 | Kavuri | |
| 2004/0088507 A1 | 5/2004 | Satoyama | |
| 2005/0010730 A1 | 1/2005 | Kano | |
| 2005/0108486 A1 | 5/2005 | Sandorfi | |
| 2005/0193235 A1 | 9/2005 | Sandorfi et al. | |
| 2006/0048002 A1 | 3/2006 | Kodi et al. | |
| 2006/0064444 A1 | 3/2006 | Van Ingen et al. | |
| 2007/0079083 A1 * | 4/2007 | Gladwin et al. | 711/154 |
| 2007/0112896 A1 | 5/2007 | Sandorfi et al. | |
| 2007/0266059 A1 | 11/2007 | Kitamura | |
| 2008/0016131 A1 | 1/2008 | Sandorfi | |
| 2008/0028007 A1 | 1/2008 | Ishii et al. | |
| 2008/0034017 A1 | 2/2008 | Giampaolo et al. | |
| 2008/0082310 A1 | 4/2008 | Sandorfi et al. | |
| 2008/0275911 A1 | 11/2008 | Sandorfi | |
| 2008/0283127 A1 | 11/2008 | Wang et al. | |

FOREIGN PATENT DOCUMENTS

| | | |
|---|---|---|
| EP | 0774715 | 5/1997 |
| WO | 9414125 | 9/1994 |
| WO | 9906912 | 2/1999 |
| WO | 03025795 | 3/2003 |
| WO | 2005017866 | 2/2005 |

OTHER PUBLICATIONS

Supplementary Euorpean Search Report from European Application No. 04789325 (dated Oct. 20, 2009).

International Search Report from International Application No. PCT/US2008/068528, dated Nov. 25, 2008.

International Search Report from International Application No. PCT/US2004/025283, dated Mar. 2, 2005.

Notification of Transmittal of the International Search Report and the Written Opinion of the International Searching Authority, or the Declaration issued in PCT Application PCT/US04/32122, filed Sep. 30, 2004.

International Preliminary Report on Patentability for International Application No. PCT/US04/32122, dated Jan. 12, 2007.

* cited by examiner

| TYPE | SIZE | BLOCK COUNT |
|------|------|-------------|
| FM | – | 1 |
| DATA | 1024 | 4 |
| DATA | 256k | 100,000 |
| FM | – | 1 |
| DATA | 1024 | 1 |
| ⋮ | ⋮ | ⋮ |
| ⋮ | ⋮ | ⋮ |

FIG. 6

EMULATED STORAGE SYSTEM

RELATED APPLICATIONS

This application is a continuation of, and claims priority under 35 U.S.C. §120 to, U.S. patent application Ser. No.: 12/176,308 filed Jul. 18, 2008, entitled "Emulated Storage Device," which is a continuation of, and claims priority under 35 U.S.C. §120 to, U.S. patent application Ser. No. 11/593,266 filed Nov. 6, 2006, entitled "Emulated Storage System" and now U.S. Pat. No. 7,430,647, which is a continuation of, and claims priority under 35 U.S.C. §120 to, U.S. patent application Ser. No. 10/911,987, filed Aug. 5, 2004, entitled "Emulated Storage System" and now U.S. Pat. No. 7,146,476, which claims the benefit under 35 U.S.C. §119(e) of U.S. Provisional Application Ser. No. 60/492,576, entitled "Synthetic Full Back-up Method," filed on Aug. 5, 2003 and U.S. Provisional Application Ser. No. 60/492,827, entitled "End-User File Restore Method," filed on Aug. 6, 2003, all of which are herein incorporated by reference in their entireties.

BACKGROUND

1. Field of Invention

Aspects of the present invention relate to data storage, and more particularly to apparatus and methods for emulating a tape storage system to provide the equivalent of full back-ups using an existing full back-up and subsequent incremental back-ups and enabling end-users to restore data from such back-ups.

2. Discussion of Related Art

Many computer systems include one or more host computers and one or more data storage systems that store data used by the host computers. These host computers and storage systems are typically networked together using a network such as a Fibre Channel network, an Ethernet network, or another type of communication network. Fibre Channel is a standard that combines the speed of channel-based transmission schemes and the flexibility of network-based transmission schemes and allows multiple initiators to communicate with multiple targets over a network, where the initiator and the target may be any device coupled to the network. Fibre Channel is typically implemented using a fast transmission media such as optical fiber cables, and is thus a popular choice for storage system networks where large amounts of data are transferred.

An example of a typical networked computing environment including several host computers and back-up storage systems is shown in FIG. 1. One or more application servers 102 are coupled via a local area network (LAN) 103 to a plurality of user computers 104. Both the application servers 102 and the user computers 104 may be considered "host computers." The application servers 102 are coupled to one or more primary storage devices 106 via a storage area network (SAN) 108. The primary storage devices 106 may be, for example, disk arrays such as are available from companies like EMC Corporation, IBM Corporation and others. Alternatively, a bus (not shown) or other network link may provide an interconnect between the application servers and the primary storage system 106. The bus and/or Fibre Channel network connection may operate using a protocol, such as the Small Component System Interconnect (SCSI) protocol, which dictates a format of packets transferred between the host computers (e.g., the application servers 102) and the storage system(s) 106.

It is to be appreciated that the networked computing environment illustrated in FIG. 1 is typical of a large system as may be used by, for example, a large financial institution or large corporation. It is to be understood that many networked computing environments need not include all the elements illustrated in FIG. 1. For example, a smaller networked computing environment may simply include host computers connected directly, or via a LAN, to a storage system. In addition, although FIG. 1 illustrates separate user computers 104, application servers 102 and media servers 114, these functions may be combined into one or more computers.

In addition to primary storage devices 106, many networked computer environments include at least one secondary or back-up storage system 110. The back-up storage system 110 may typically be a tape library, although other large capacity, reliable secondary storage systems may be used. Typically, these secondary storage systems are slower than the primary storage devices, but include some type of removable media (e.g., tapes, magnetic or optical disks) that may be removed and stored off-site.

In the illustrated example, the application servers 102 may be able to communicate directly with the back-up storage system 110 via, for example, an Ethernet or other communication link 112. However, such a connection may be relatively slow and may also use up resources, such as processor time or network bandwidth. Therefore, a system such as illustrated may include one or more media servers 114 that may provide a communication link 115, using for example, Fibre Channel, between the SAN 108 and the back-up storage system 110.

The media servers 114 may run software that includes a back-up/restore application that controls the transfer of data between host computers (such as user computers 104, the media servers 114, and/or the application servers 102), the primary storage devices 106 and the back-up storage system 110. Examples of back-up/restore applications are available from companies like Veritas, Legato and others. For data protection, data from the various host computers and/or the primary storage devices in a networked computing environment may be periodically backed-up onto the back-up storage system 110 using a back-up/restore application, as is known in the art.

Of course, it is to be appreciated that, as discussed above, many networked computer environments may be smaller and may include fewer components than does the exemplary networked computer environment illustrated in FIG. 1. Therefore, it is also to be appreciated that the media servers 114 may in fact be combined with the application servers 102 in a single host computer, and that the back-up/restore application may be executed on any host computer that is coupled (either directly or indirectly, such as through a network) to the back-up storage system 110.

One example of a typical back-up storage system is a tape library that includes a number of tape cartridges and at least one tape drive, and a robotic mechanism that controls loading and unloading of the cartridges into the tape drives. The back-up/restore application provides instructions to the robotic mechanism to locate a particular tape cartridge, e.g., tape number 0001, and load the tape cartridge into the tape drive so that data may be written onto the tape. The back-up/restore application also controls the format in which data is written onto the tapes. Typically, the back-up/restore application may use SCSI commands, or other standardized commands, to instruct the robotic mechanism and to control the tape drive(s) to write data onto the tapes and to recover previously written data from the tapes.

Conventional tape library back-up systems suffer from a number of problems including speed, reliability and fixed capacity. Many large companies need to back-up Terabytes of data each week. However, even expensive, high-end tapes can usually only read/write data at speeds of 30-40 Megabytes per second (MB/s), which translates to about 50 Gigabyte per hour (GB/hr). Thus, to back-up one or two Terabytes of data to a tape back-up system may take at least 10 to 20 hours of continuous data transfer time.

In addition, most tape manufacturers will not guarantee that it will be possible to store (or restore) data to/from a tape if the tape is dropped (as may happen relatively frequently in a typical tape library because either a human operator or the robotic mechanism may drop a tape during a move or load operation) or if the tape is exposed to non-ideal environmental conditions, such as extremes in temperature or moisture. Therefore, a great deal of care needs to be taken to store tapes in a controlled environment. Furthermore, the complex machinery of a tape library (including the robotic mechanism) is expensive to maintain and individual tape cartridges are relatively expensive and have limited lifespans.

SUMMARY OF INVENTION

Embodiments of the present invention provide a back-up storage system that overcomes or alleviates some or all of the problems of conventional tape library systems and that may provide greater flexibility than do conventional tape library systems.

In broad overview, aspects and embodiments of the present invention provide a random-access based storage system that emulates a conventional tape back-up storage system such that a back-up/restore application sees the same view of devices and media as with a physical tape library. The storage system of the invention uses software and hardware to emulate physical tape media and replace them with one or more random-access disk arrays, translating tape format, linear, sequential data to data that is suitable for storage on disk.

According to some aspects and embodiments of the present invention, there is provided a mechanism for decoding existing back-up data sets and storing the metadata (i.e., data that represents information about user data) in a searchable metadata cache, a mechanism to allow searching and/or viewing of the metadata cache for files or objects, and a mechanism for downloading these files or objects via a web connection from data stored through existing back-up policies and practices of typical back-up software. Also included may be a mechanism for authenticating a user through existing authentication mechanisms, and for limiting the view of the metadata cache based on a current user's credentials.

According to other aspects and embodiments of the invention, there is provided a mechanism for performing a logical merge of multiple cartridge representations in a metadata cache, and a mechanism for appropriately labeling and bar-coding a newly synthesized cartridge such that it is accepted by back-up/restore software as a valid data set. Also, according to further aspects and embodiments of the invention, there is provided a mechanism for either storing multiple copies of data elements that represent a synthetic cartridge, or for storing only pointers to existing data represented in the metadata cache.

According to one embodiment, a method comprises acts of creating a full back-up data set comprising a first plurality of data files, creating at least one incremental back-up data set comprising a second plurality of data files, determining a most recent copy of each data file of the first and second pluralities of data files, storing a plurality of indicators, each indicator identifying a storage location in one of the full back-up data set and the at least one incremental back-up data set of the most recent copy of each data file of the first and second pluralities of data files, and creating a synthetic full back-up data set that corresponds to the most recent copy of each data file of the first and second pluralities of data files based upon the plurality of indicators.

In one embodiment, the method further comprises an act of storing metadata associated with each data file in each of the first and second pluralities of data files in a searchable metadata cache. In another embodiment, the act of determining the most recent copy includes analyzing metadata associated with each data file of the first and second pluralities of data files to determine the most recent copy of each data file of the first and second pluralities of data files. According to another embodiment, the method further comprises an act of providing an interface to allow a user to search the searchable metadata cache to locate the most recent copy of at least one data file in one of the first and second pluralities of data files, wherein the act of providing an interface may also includes an act of providing an interface that permits the user to download and restore the most recent copy of the at least one data file using the interface.

In other examples, the method further comprises acts of analyzing one or both of the existing full back-up data set and the incremental back-up data set to provide lists of each data file in the first and second pluralities of data files. In one example, the first plurality of data files includes a first data file and wherein the second Is plurality of data files includes a modified copy of the first data file. In another example, the second plurality of data files includes at least one data file, a version of which is not included in the first plurality of data files.

According to another embodiment, a back-up storage system comprises a back-up storage media for storing the first and second pluralities of data files, and a controller including at least one processor configured to execute a set of instructions implementing embodiments of the method described above. In another embodiment, a computer readable medium is encoded with a plurality of instructions that when executed on at least one processor (for example, a processor of a storage system) implement embodiments of the method described above.

In another embodiment, a synthetic full back-up data set comprises a plurality of indicators, each indicator identifying a storage location, in one of an existing full back-up data set and at least one incremental back-up data set, of a most recent copy of a plurality of data files, wherein the existing full back-up data set comprises a stored copy of at least one of the plurality of data files, and wherein the at least one incremental data set comprises a stored copy of remaining ones of the plurality of data files.

According to another embodiment, there is provided a method of creating a synthetic full back-up data set from an existing full back-up data set comprising a first plurality of data files, and an incremental back-up data set comprising a second plurality of data files. The method comprises determining a latest version of the each data file of the first and second pluralities of data files, storing a plurality of indicators, each indicator identifying a storage location in one of the existing full back-up data set and the incremental back-up data set of a most recent copy of each data file of the first and second pluralities of data files, and creating the synthetic full back-up data set that corresponds to the most recent copy of each data file of the first and second pluralities of data files based upon the plurality of indicators.

According to another embodiment, in a back-up storage system, there is provided a method of locating backed-up data files on the storage system. The method comprises providing a user interface, storing metadata corresponding to the backed-up data files in a searchable storage medium, and using the metadata to present on the user interface, a directory structure of the data files stored on the storage system. In one example, the method further comprises authenticating a user, and presenting the directory structure based at least in part on the authenticating step.

According to another embodiment, in a back-up storage system, a method of locating a backed-up data file on the storage system comprises storing a plurality of indicators that identify storage locations of each of a plurality of backed-up data files on the storage system, each indicator corresponding to one data file of the plurality of data files, and providing a user interface that enables a user to locate the backed-up data file based on the plurality of indicators.

According to another aspect, a method is provided that includes acts of receiving a data stream to be stored on a first storage system, the data stream comprising a data object and metadata that describes attributes of the data object, extracting the metadata from the data stream, storing the data object on the first storage system and storing the extracted metadata, separately from the data object, on a computer-readable medium. In one example, receiving a data stream comprises receiving a data stream to be stored on a backup storage system. Additionally, receiving the data stream may comprise receiving the data stream from a primary storage system via any one of a backup/restore application, an archiving application or a data migration application.

In the method, extracting the metadata from the data stream may include extracting the metadata from the data stream during the step of receiving the data stream. In addition, extracting the metadata may include extracting a modification history of the data object. Furthermore, extracting the metadata may comprise extracting security data associated with the data object. Extracting the security data may include extracting at least one identifier of a user authorized to access the data object associated with the security data. In another example, extracting the metadata may comprise extracting a storage location on a primary storage system of the data object. Extracting the metadata may also comprise extracting a backup volume associated with the data object. Alternatively, extracting the metadata may include extracting a size of the data object. Similarly, extracting the metadata may include extracting an identifier of a software application associated with the data object. Extracting the metadata may also comprise extracting a file name. In the method, extracting the metadata may include extracting a host server name. Extracting the metadata may also comprise extracting metadata created by an application transmitting the data stream.

In another example, storing the extracted metadata comprises storing the extracted metadata in a searchable cache. Furthermore, storing the extracted metadata in a searchable cache may include storing the extracted metadata in a database. Alternatively, storing the extracted metadata in a searchable cache may include storing a portion of the extracted metadata in a database and storing a portion of the extracted metadata in at least one file. In addition, storing the extracted metadata may comprise storing the extracted metadata in a cache of memory. In another example, storing the extracted metadata may comprise storing the extracted metadata on the first storage system. Alternatively, storing the extracted metadata may include storing the extracted metadata on a second storage system. Storing the data object may include storing a file. Similarly, storing the data object may comprise storing a block of data.

According to another aspect, a method is provided that includes acts of receiving a data stream to be stored on a first storage system, the data stream comprising a data object and metadata that describes attributes of the data object, storing the data stream on the first storage system, extracting the metadata from the data stream and storing the extracted metadata, separately from the data stream, on a computer-readable medium. In the method, receiving a data stream may comprise receiving a data stream to be stored on a backup storage system.

In one example, storing the extracted metadata may include storing the extracted metadata in a cache of memory. In another example, storing the extracted metadata may comprise storing the extracted metadata on the first storage system. Alternatively, storing the extracted metadata may comprise storing the extracted metadata on a second storage system. Extracting the metadata from the data stream may be performed after storing the data stream on the backup storage system. In another example, extracting the metadata from the data stream may be performed Is while storing the data stream on the backup storage system. In another example, extracting the metadata from the data stream may be performed before storing the data stream on the backup storage system.

According to another aspect, a storage system is provided that includes a first storage medium, an interface configured to receive a data stream including a data object to be stored on the first storage medium and a controller. The controller may be configured to extract metadata from the data stream, the metadata being descriptive of attributes of the data object, and to direct the extracted metadata to be stored on a computer-readable medium. In one example, the computer-readable medium may include a cache of memory. In another example, the computer-readable medium may include the first storage medium. In another example, the computer-readable medium may include a second storage medium. Furthermore, the controller may be further configured to arrange extracted metadata into a searchable cache. The searchable cache may comprise a database and at least one file referenced in the database.

According to another aspect, a method is provided that includes acts of receiving a data stream including objects to be stored on a backup storage system, acquiring metadata descriptive of attributes of the objects and storing the acquired metadata on the backup storage system.

According to another aspect, a computer-readable medium is provided. The computer-readable medium may comprise instructions that, as a result of being executed by a processor, instruct the processor to perform a method including acts of receiving a data stream to be stored on a first storage system, the data stream comprising a data object and metadata that describes attributes of the data object, extracting the metadata from the data stream, storing the data object on the first storage system and storing the extracted metadata, separately from the data object, on a computer-readable medium.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 6 is one example of a tape directory structure according to aspects of the invention;

DETAILED DESCRIPTION

Figure 1:
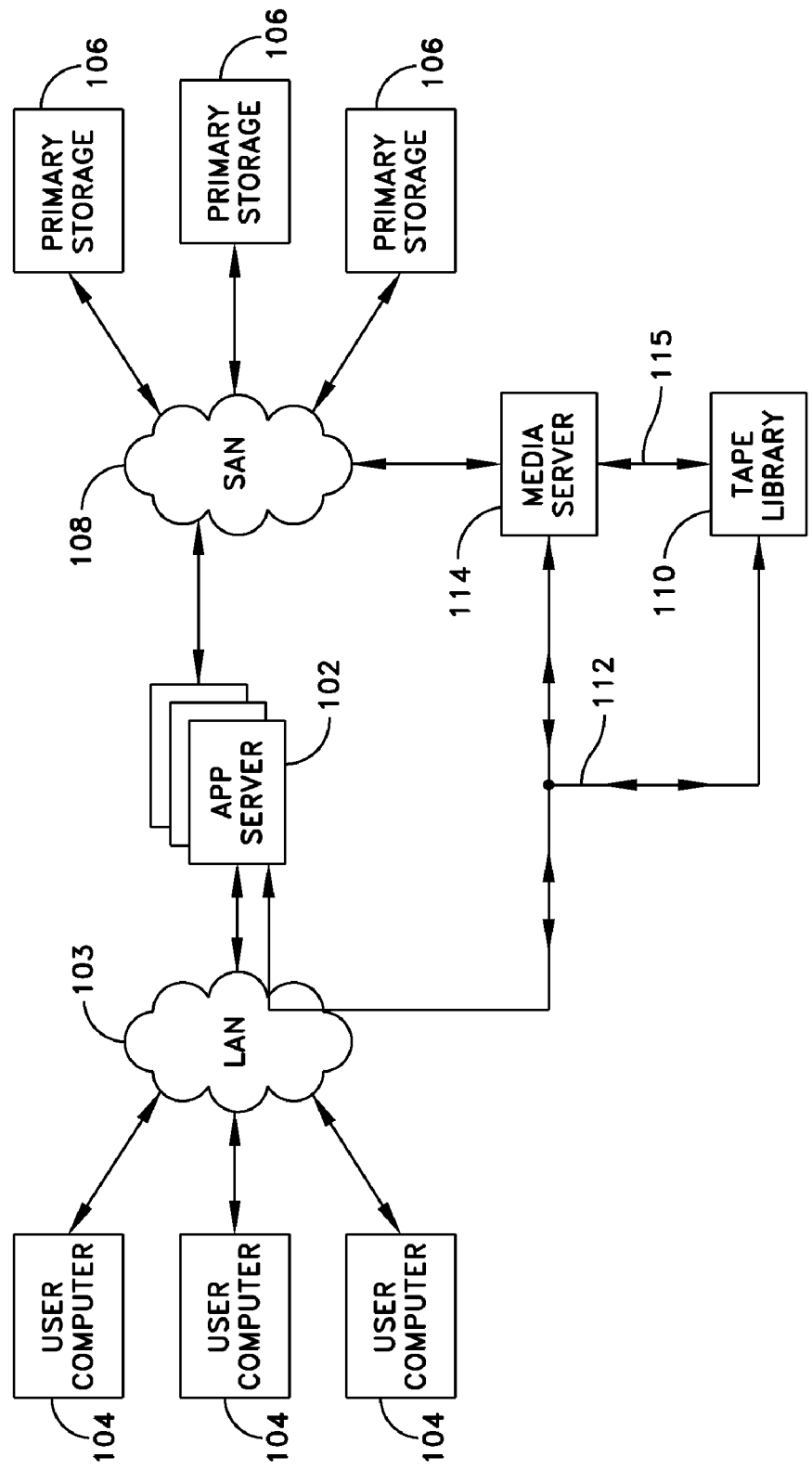
FIG. 1 is a block diagram of one example of a large-scale networked computing environment that includes a back-up storage system.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "host computer" refers to any computer that has at least one processor, such as a personal computer, a workstation, a mainframe, a networked client, a server, etc. that is capable of communication with other devices, such as a storage system or other host computers. Host computers may include media servers and application servers (as described previously with reference to FIG. 1) as well as user computers (which may be user workstations, PCs, mainframes, etc.). In addition, within this disclosure, the term "networked computer environment" includes any computing environment in which a plurality of host computers are connected to one or more shared storage systems in such a manner that the storage system(s) can communicate with each of the host computers. Fibre Channel is one example of a communication network that may be used with embodiments of the present invention. However, it is to be appreciated that the networks described herein are not limited to Fibre Channel, and that the various network components may communicate with each other over any network connection, such as Token Ring or Ethernet instead of, or in addition to Fibre Channel, or over combinations of different network connections. Moreover, aspects of the present invention may also be used in bus topologies, such as SCSI or parallel SCSI.

According to various embodiments and aspects of the present invention, there is provided a virtual removable media library back-up storage system that may use one or more disk arrays to emulate a removable media based storage system. Using embodiments of the invention, data may be backed-up onto the disk array(s) using the same back-up/restore application as would have been used to back-up the data onto removable media (such as tapes, magnetic disks, optical disks, etc.), without a user having to make any modifications or adjustments to the existing back-up procedures or having to purchase a new back-up/restore application. In one embodiment, described in detail herein, the removable media that are emulated are tapes, and the back-up storage system of the invention emulates a tape library system including tapes and the robotic mechanism used to handle tapes in a conventional tape library system.

A storage system according to aspects of the invention includes hardware and software that together interface with a host computer (running the back-up/restore application) and a back-up storage media. The storage system may be designed to emulate tapes, or other types of removable storage media, such that the back-up/restore application sees the same view of devices and media as with a physical tape library, and to translate linear, sequential, tape format data into data that is suitable for storage on random-access disks. In this manner, the storage system of the invention may provide enhanced functionality (such as, allowing users to search for individual backed-up user files, as discussed below) without requiring new back-up/restore application software or policies.

Figure 2:
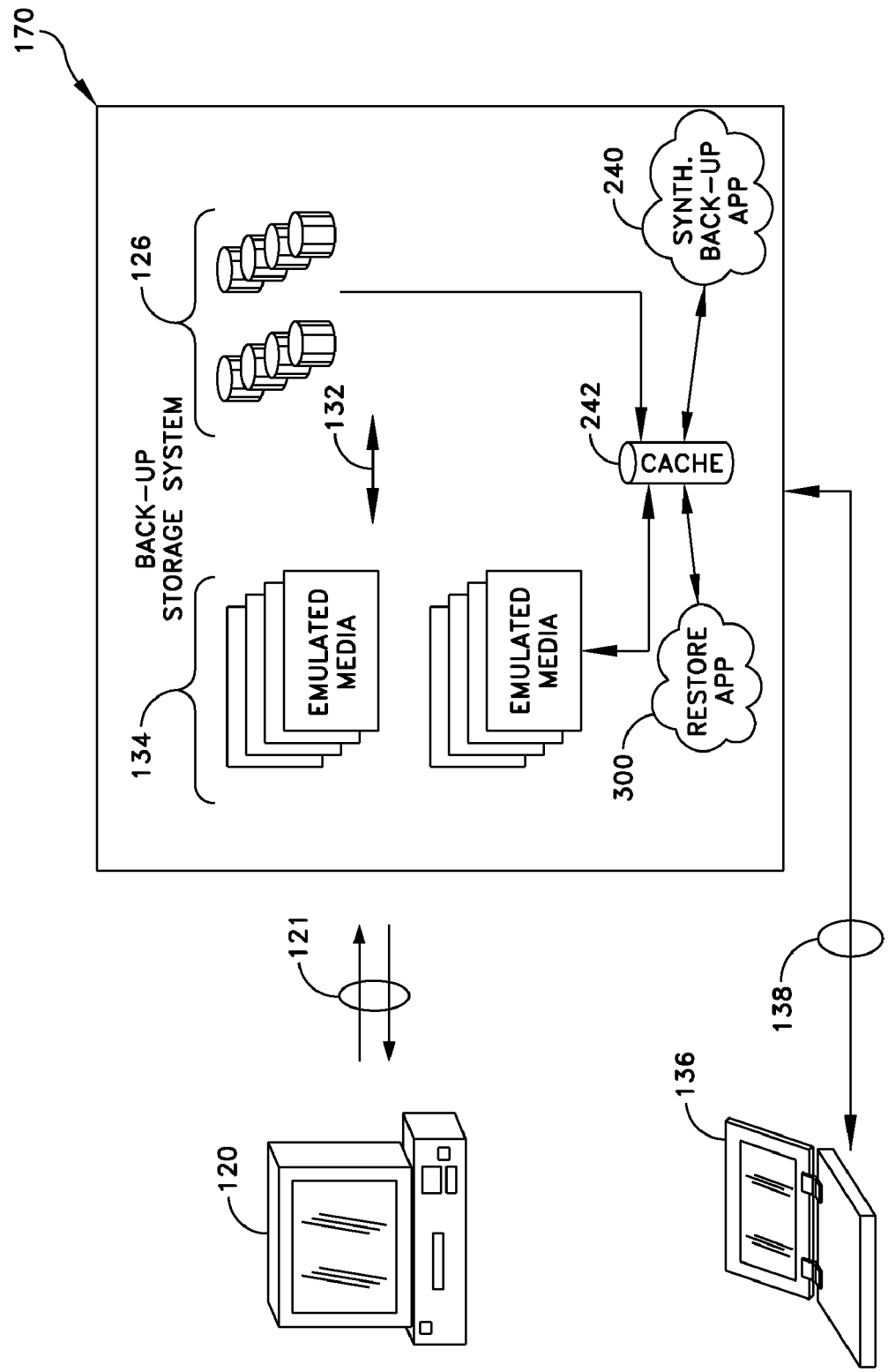
FIG. 2 is a block diagram of one embodiment of a networked computing environment including a storage system according to aspects of the invention.

Referring to FIG. 2, there is illustrated in block diagram form, one embodiment of a networked computing environment including a back-up storage system 170 according to aspects of the invention. As illustrated, a host computer 120 is coupled to the storage system 170 via a network connection 121. This network connection 121 may be, for example a Fibre Channel connection to allow high-speed transfer of data between the host computer 120 and the storage system 170. It is to be appreciated that the host computer 120 may be, or may include, one or more application servers 102 (see FIG. 1) and/or media servers 114 (see FIG. 1) and may enable back-up of data from either any of the computers present in the networked computing environment or from a primary storage device 106 (see FIG. 1). In addition, one or more user computers 136 may also be coupled to the storage system 170 via another network connection 138, such as an Ethernet connection. As discussed in detail below, the storage system may enable users of the user computer 136 to view and optionally restore backed-up user files from the storage system.

The storage system includes back-up storage media 126 that may be, for example, one or more disk arrays, as discussed in more detail below. The back-up storage media 126 provide the actual storage space for backed-up data from the host computer(s) 120. However, the storage system 170 may also include software and additional hardware that emulates a removable media storage system, such as a tape library, such that, to the back-up/restore application running on the host computer 120, it appears as though data is being backed-up onto conventional removable storage media. Thus, as illustrated in FIG. 2, the storage system 170 may include "emulated media" 134 which represent, for example, virtual or emulated removable storage media such as tapes. These "emulated media" 134 are presented to the host computer by the storage system software and/or hardware and appear to the host computer 120 as physical storage media. Further interfacing between the emulated media 134 and the actual back-up storage media 126 may be a storage system controller (not shown) and a switching network 132 that accepts the data from the host computer 120 and stores the data on the back-up storage media 126, as discussed more fully in detail below. In this manner, the storage system "emulates" a conventional tape storage system to the host computer 120.

According to one embodiment, the storage system may include a "logical metadata cache" 242 that stores metadata relating to user data that is backed-up from the host computer 120 onto the storage system 170. As used herein, the term "metadata" refers to data that represents information about user data and describes attributes of actual user data. The logical metadata cache 242 represents a searchable collection of data that enables users and/or software applications to randomly locate backed-up user files, compare user files with one another, and otherwise access and manipulate backed-up user files. Two examples of software applications that may use the data stored in the logical metadata cache 242 include a synthetic full back-up application 240 and an end-user restore application 300 that are discussed more fully below.

In brief overview, the synthetic full back-up application 240 is capable of creating a synthetic full back-up data set from one existing full back-up data set and one or more incremental back-up data sets. The synthetic full backup may obviate the need to perform periodic (e.g., weekly) full back-ups, thereby saving considerable time and network resources. Details of the synthetic full back-up application 240 are described further below. The end-user restore application 300, also described more fully in detail below, enables end-users (e.g., operators of the user computers 136) to Is browse, locate, view and/or restore previously backed-up user files from the storage system 170.

As discussed above, the storage system 170 includes hardware and software that interface with the host computer 120 and the back-up storage media 126. Together, the hardware and software of embodiments of the invention may emulate a conventional tape library back-up system such that, from the point of view of the host computer 120, data appears to be backed-up onto tape, but is in fact backed-up onto another storage medium, such as, for example, a plurality of disk arrays.

Figure 3:
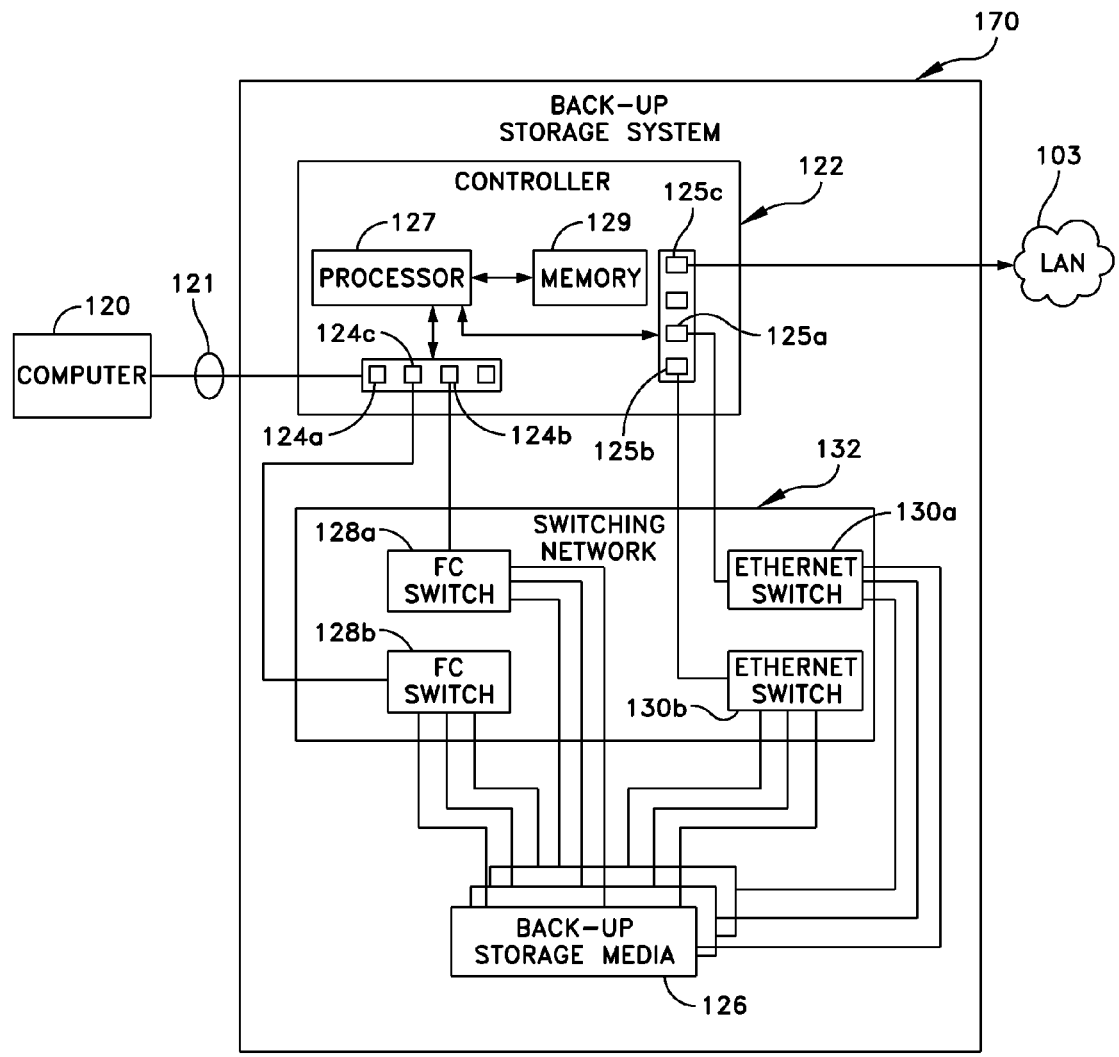
FIG. 3 is a block diagram of one embodiment of a storage system according to aspects of the invention.

Referring to FIG. 3, there is illustrated in block diagram form, one embodiment of a storage system 170 according to aspects of the invention. In one example, the hardware of the storage system 170 includes a storage system controller 122 and a switching network 132 that connects the storage system controller 122 to the back-up storage media 126. The storage system controller 122 includes a processor 127 (which may be a single processor or multiple processors) and a memory 129 (such as RAM, ROM, PROM, EEPROM, Flash memory, etc. or combinations thereof) that may run all or some of the storage system software. The memory 129 may also be used to store metadata relating to the data stored on the back-up storage media 126. Software, including programming code that implements embodiments of the present invention, is generally stored on a computer readable and/or writeable nonvolatile recording medium, such as RAM, ROM, optical or magnetic disk or tape, etc., and then copied into memory 129 wherein it may then be executed by the processor 127. Such programming code may be written in any of a plurality of programming languages, for example, Java, Visual Basic, C, C#, or C++, Fortran, Pascal, Eiffel, Basic, COBAL, or combinations thereof, as the present invention is not limited to a particular programming language. Typically, in operation, the processor 127 causes data, such as code that implements embodiments of the present invention, to be read from a nonvolatile recording medium into another form of memory, such as RAM, that allows for faster access to the information by the processor than does the nonvolatile recording medium.

As shown in FIG. 3, the controller 122 also includes a number of port adapters that connect the controller 122 to the host computer 120 and to the switching network 132. As illustrated, the host computer 120 is coupled to the storage system via a port adapter 124a, which may be, for example, a Fibre Channel port adapter. Via a storage system controller 122, the host computer 120 backs up data onto the back-up storage media 126 and can recover data from the back-up storage media 126.

In the illustrated example, the switching network 132 may include one or more Fibre Channel switches 128a, 128b. The storage system controller 122 includes a plurality of Fibre Channel port adapters 124b and 124c to couple the storage system controller to the Fibre Channel switches 128a, 128b. Via the Fibre Channel switches 128a, 128b, the storage system controller 122 allows data to be backed-up onto the back-up storage media 126. As illustrated in FIG. 3, the switching network 132 may further include one or more Ethernet switches 130a, 130b that are coupled to the storage system controller 122 via Ethernet port adapters 125a, 125b. In one example, the storage system controller 122 further includes another Ethernet port adapter 125c that may be coupled to, for example, a LAN 103 to enable the storage system 170 to communicate with host computes (e.g., user computers), as discussed below.

In the example illustrated in FIG. 3, the storage system controller 122 is coupled to the back-up storage media 126 via a switching network that includes two Fibre Channel switches and two Ethernet switches. Provision of at least two of each type of switch within the storage system 170 eliminates any single points of failure in the system. In other words, even if one switch (for example, Fibre Channel switch 128a) were to fail, the storage system controller 122 would still be able to communicate with the back-up storage media 126 via another switch. Such an arrangement may be advantageous in terms of reliability and speed. For example, as discussed above, reliability is improved through provision of redundant components and elimination of single points of failure. In addition, in some embodiments, the storage system controller is able to back-up data onto the back-up storage media 126 using some or all of the Fibre Channel switches in parallel, thereby increasing the overall back-up speed. However, it is to be appreciated that there is no requirement that the system comprise two or more of each type of switch, nor that the switching network comprise both Fibre Channel and Ethernet switches. Furthermore, in examples wherein the back-up storage media 126 comprises a single disk array, no switches at all may be necessary.

As discussed above, in one embodiment, the back-up storage media 126 may include one or more disk arrays. In one preferred embodiment, the back-up storage media 126 include a plurality of ATA or SATA disks. Such disks are "off the shelf" products and may be relatively inexpensive compared to conventional storage array products from manufacturers such as EMC, IBM, etc. Moreover, when one factors in the cost of removable media (e.g., tapes) and the fact that such media have a limited lifetime, such disks are comparable in cost to conventional tape-based back-up storage systems. In addition, such disks can read/write data substantially faster than can tapes. For example, over a single Fibre Channel connection, data can be backed-up onto a disk at a speed of at least about 150 MB/s, which translates to about 540 GB/hr, significantly faster (e.g., by an order of magnitude) than tape back-up speeds. In addition, several Fibre Channel connections may be implemented in parallel, thereby increasing the speed even further. In accordance with an embodiment of the present invention, back-up storage media may be organized to implement any one of a number of RAID (Redundant Array of Independent Disks) schemes. For example, in one embodiment, the back-up storage media may implement a RAID-5 implementation.

As discussed above, embodiments of the invention emulate a conventional tape library back-up system using disk arrays to replace tape cartridges as the physical back-up storage media, thereby providing a "virtual tape library." Physical tape cartridges that would be present in a conventional tape library are replaced by what is termed herein as "virtual cartridges." It is to be appreciated that for the purposes of this disclosure, the term "virtual tape library" refers to an emulated tape library which may be implemented in software and/or physical hardware as, for example, one or more disk array(s). It is further to be appreciated that although this discussion refers primarily to emulated tapes, the storage system may also emulate other storage media, for example, a CD-ROM or DVD-ROM, and that the term "virtual cartridge" refers generally to emulated storage media, for example, an emulated tape or emulated CD. In one embodiment, the virtual cartridge in fact corresponds to one or more hard disks.

Therefore, in one embodiment, a software interface is provided to emulate the tape library such that, to the back-up/restore application, it appears that the data is being backed-up onto tape. However, the actual tape library is replaced by one or more disk arrays such that the data is in fact being backed-up onto these disk array(s). It is to be appreciated that other types of removable media storage systems may be emulated and the invention is not limited to the emulation of tape library storage systems. The following discussion will now explain various aspects, features and operation of the software included in the storage system 170.

It is to be appreciated that although the software may be described as being "included" in the storage system 170, and may be executed by the processor 127 of the storage system controller 122 (see FIG. 3), there is no requirement that all the software be executed on the storage system controller 122. The software programs such as the synthetic full back-up application and the end-user restore application may be executed on the host computers and/or user computers and portions thereof may be distributed across all or some of the storage system controller, the host computer(s), and the user computer(s). Thus, it is to be appreciated that there is no requirement that the storage system controller be a contained physical entity such as a computer. The storage system 170 may communicate with software that is resident on a host computer such as, for example, the media server(s) 114 or application servers 102. In addition, the storage system may contain several software applications that may be run or resident on the same or different host computers. Moreover, it is to be appreciated that the storage system 170 is not limited to a discrete piece of equipment, although in some embodiments, the storage system 170 may be embodied as a discrete piece of equipment. In one example, the storage system 170 may be provided as a self-contained unit that acts as a "plug and play" (i.e., no modification need be made to existing back-up procedures and policies) replacement for conventional tape library back-up systems. Such a storage system unit may also be used in a networked computing environment that includes a conventional back-up system to provide redundancy or additional storage capacity.

As discussed above, according to one embodiment, the host computer 120 (which may be, for example, an application server 102 or media server 114, see FIG. 1) may back-up data onto the back-up storage media 126 via the network link (e.g., a Fibre Channel link) 121 that couples the host computer 120 to the storage system 170. It is to be appreciated that although the following discussion will refer primarily to the back-up of data onto the emulated media, the principles apply also to restoring backed-up data from the emulated media. The flow of data between the host computer 120 and the emulated media 134 may be controlled by the back-up/restore application, as discussed above. From the view point of the back-up/restore application, it may appear that the data is actually being backed-up onto a physical version of the emulated media.

Figure 4:
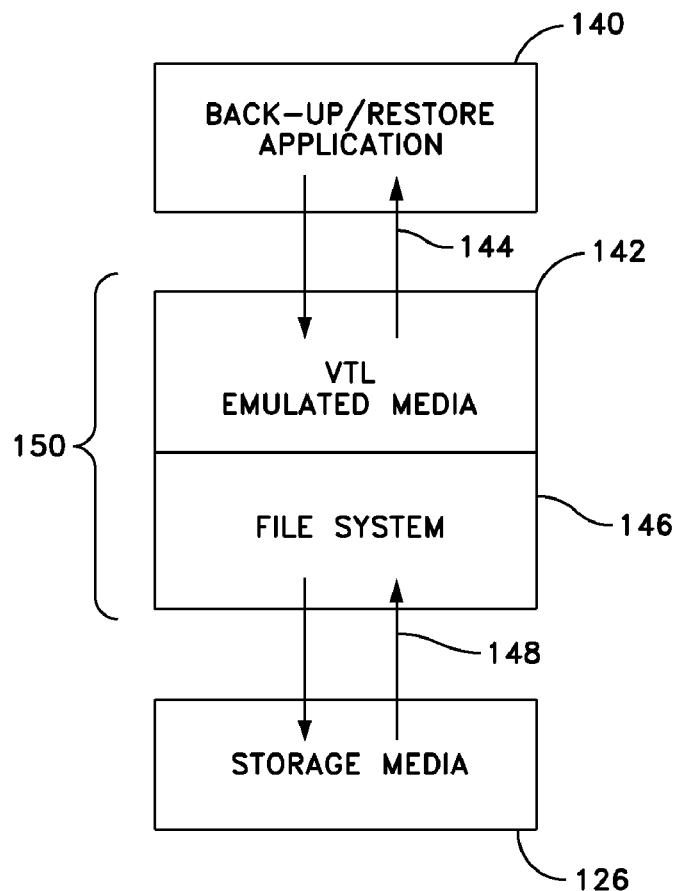
FIG. 4 is a block diagram illustrating a virtual layout of one embodiment of a storage system according to aspects of the invention.

Referring to FIG. 4, the storage system software 150 may include one or more logical abstraction layer(s) that represent the emulated media and provide an interface between a back-up/restore application 140 resident on the host computer 120 and the back-up storage media 126. The software 150 accepts tape format data from the back-up/restore application 140 and translates that data into data suitable for storage on random-access disks (e.g., hard disks, optical disks and the like). In one example, this software 150 is executed on the processor 127 of the storage system controller 122 and may be stored in memory 129 (see FIG. 3).

According to one embodiment, the software 150 may include a layer, referred to herein as the virtual tape library (VTL) layer 142 that may provide a SCSI emulation of tapes, tape drives, and also the robotic mechanisms used to transfer tapes to and from the tape drives. The back-up/restore application 140 may communicate (e.g., back-up or write data to the emulated media) with the VTL 142 using, for example, SCSI commands, represented by arrows 144. Thus, the VTL may form a software interface between the other storage system software and hardware and the back-up/restore application, presenting the emulated storage media 134 (FIG. 2) to a back-up/restore application and allowing the emulated media to appear to the back-up/restore application as conventional removable back-up storage media.

A second software layer referred to herein as the file system layer 146 may provide an interface between the emulated storage media (represented in the VTL) and the physical back-up storage media 126. In one example, the file system, 146 acts as a mini operating system to communicate with the back-up storage media 126 using, for example, SCSI commands, represented by arrows 148, to read and write data to and from the back-up storage media 126.

In one embodiment, the VTL provides generic tape library support and may support any SCSI media changer. Emulated tape devices may include, but are not limited to, an IBM LTO-1 and LTO-2 tape device, a Quantum SuperDLT320 tape device, a Quantum P3000 tape library system, or a StorageTek L180 tape library system. Within the VTL, each virtual cartridge is a file that may grow dynamically as data is stored. This is in contrast to conventional tape cartridges which have a fixed size. One or more virtual cartridges may be stored in a system file as described further below with respect to FIG. 5.

Figure 5:
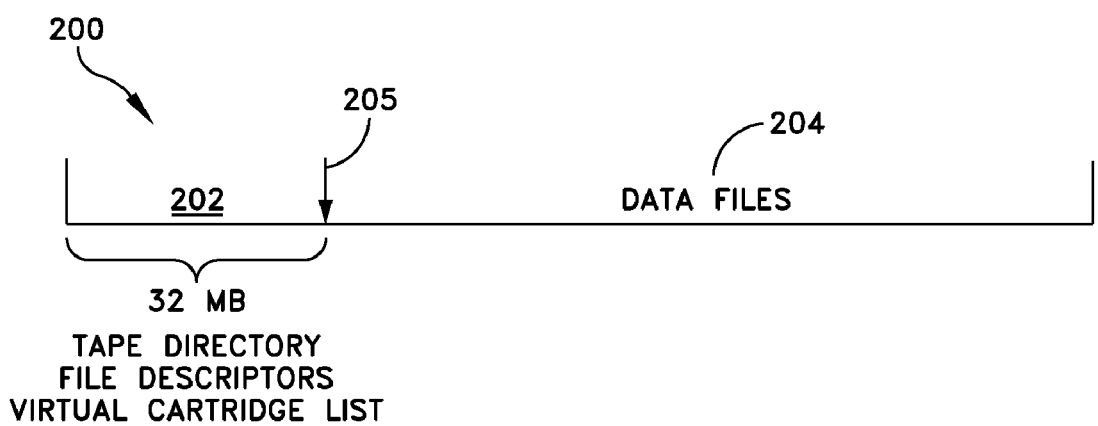
FIG. 5 is a schematic layout of one example of a system file according to aspects of the invention.

FIG. 5 illustrates one example of a data structure within the file system software 146 that illustrates a system file 200 in accordance with an embodiment of the present invention. In this embodiment, the system file 200 includes a header 202 and data 204. The header 202 may include information that identifies each of the virtual cartridges that are stored in that system file. The header may also contain information such as, whether a virtual cartridge is write protected, the dates of creation/modification of the virtual cartridges, etc. In one example, the header 202 includes information uniquely identifying each virtual cartridge and distinguishing each virtual cartridge from other virtual cartridges stored in the storage system. For example, this information may include a name and an identifying number (corresponding to a barcode that would typically be present on a physical tape so that the tape could be identified by the robotic mechanism) of the virtual cartridge. The header 202 may also contain additional information such as a capacity of each of the virtual cartridges, a date of last modification, etc.

According to one embodiment of the present invention, the size of the header 202 may be optimized to reflect the type of data being stored (e.g., virtual cartridges representing data back-up from one or more host computer systems) and the number of distinct sets of such data (e.g., virtual cartridges) that the system can track. For example, data that is typically backed-up to a tape storage system is typically characterized by larger data sets representing numerous system and user files. Because the data sets are so large, the number of discrete data files to be tracked may be correspondingly small. Accordingly, in one embodiment, the size of the header 202 may selected based on a compromise between storing too much data to efficiently keep track of (i.e., the header being too big) and not having space to store a sufficient number of cartridge identifiers (i.e., header being too small). In one exemplary embodiment, the header 202 utilizes the first 32 MB of the system file 200. However it is to be appreciated that the header 202 may have a different size based on system needs and characteristics and that, depending on system needs and capacity, one may select a different size for the header 202.

It is to be appreciated that, from the point of view of the back-up/restore application, the virtual cartridges appear as physical tape cartridges with all the same attributes and features. That is, to the back-up restore application, the virtual cartridges appear as sequentially written tapes. However, in one preferred embodiment, the data stored in the virtual cartridges is not stored in a sequential format on back-up storage media 126. Rather, the data that appears to be written to the virtual cartridges is in fact stored in the storage system's files as randomly accessible, disk-format data. Metadata is used to link the stored data to virtual cartridges so that the back-up/restore application can read and write data in cartridge format.

Thus, in broad overview of one preferred embodiment, user and/or system data (referred to herein as "file data") is received by the storage system 170 from the host computer 120 and is stored on the disk array(s) making up the back-up storage media 126. The software 150 (see FIG. 4) and/or hardware of the storage system writes this file data to the back-up storage media 126 in the form of system files, as is described in more detail below. Metadata is extracted from the backed-up file data by the storage system controller to keep track of attributes of the user and/or system files that are backed-up. For example, such metadata for each file may include the file name, a date of creation or last modification of the file, any encryption information relating to the file, and other information. In addition, metadata may be created by the storage system for each file that links the file to a virtual cartridge. Using such metadata, the software provides to the host computer an emulation of tape cartridges; however the file data is in fact not stored in tape format, but rather in the system files, as discussed below. Storing the data in system files, rather than in sequential cartridge format, may be advantageous in that it allows fast, efficient and random access to individual files without the need to scan through sequential data to find a particular file.

As discussed above, according to one embodiment, file data (i.e., user and/or system data) is stored on the back-up storage media as system files, each system file including a header and data, the data being the actual user and/or system files. The header 202 of each system file 200 includes a tape directory 206 that contains metadata linking the user and/or system files to virtual cartridges. The term "metadata" as used herein refers not to user or system file data, but to data that describes attributes of actual user and/or system data. According to one example, the tape directory may define, down to the byte level, the layout of data on the virtual cartridges. In one embodiment, the tape directory 206 has a table structure, as illustrated in FIG. 6. The table includes a column 220 for the type of information stored (e.g., data, a file marker (FM), etc.), a column 222 for the size of the disk blocks used in bytes, and a column 224 that counts the number of disk blocks in which the file data is stored. Thus, the tape directory allows the controller to have random (as opposed to sequential) access to any data file stored on back-up storage media 126. For example, referring to FIG. 6, the data file 226 may be quickly located on the virtual tape because the tape directory indicates that the data of file 226 begins one block from the beginning of the system file 200. This one block has no size because it corresponds to a file marker (FM). File markers are not stored in the system file, i.e., file markers correspond to zero data. The tape directory includes file markers because they are used by conventional tapes and the back-up/restore application thus writes file markers along with data files and expects to see file markers when viewing a virtual cartridge. Therefore, file markers are kept track of in the tape directory. However, file markers do not represent any data and are therefore not stored in the data section of the system file. Thus, the data of file 226 begins at the beginning of the data section of the system file, indicated by arrow 205 (see FIG. 5), and is 1024 bytes in length (i.e., one disk block that is 1024 bytes in size). It should be appreciated that other file data may be stored in a block size other than 1024 bytes, depending on the amount of data, i.e., the size of the data file. For example, larger data files may be stored using larger dick block sizes for efficiency.

In one example, the tape directory may be contained in a "file descriptor" that is associated with each data file backed-up onto the storage system. The file descriptor contains metadata relating the data files 204 stored on the storage system. In one embodiment, the file descriptor may be implemented in accordance with a standardized format, such as the tape archive (tar) format used by most Unix based systems. Each file descriptor may include information such as the name of the corresponding user file, the date the user file was created/modified, the size of the user file, any access restrictions on the user file, etc. Additional information stored in the file descriptor may further include information describing the directory structure from which the data was copied. Thus, the file descriptor may contain searchable metadata about a corresponding data file, as is discussed in more detail below.

From the point of view of the back-up/restore application, any virtual cartridge may contain a plurality of data files and corresponding file descriptors. From the point of view of the storage system software, the data files are stored in system files that may be linked to, for example, a particular back-up job. For example, a back-up executed by one host computer at a particular time may generate one system file that may correspond to one or more virtual cartridges. Virtual cartridges may thus be of any size and may grow dynamically as more user files are stored on the virtual cartridges.

Referring again to FIG. 2, as discussed above, the storage system 170 may include a synthetic full back-up software application 240. In one embodiment, the host computer 120 backs-up data onto the emulated media 134, forming one or more virtual cartridges. In some computing environments, a "full back-up," i.e., a back-up copy of all data stored on the primary storage system in the network (see FIG. 1), may be accomplished periodically (e.g., weekly). This process is typically very lengthy due the large amount of data that is to be copied. Therefore, in many computing environments, additional back-ups, termed incremental back-ups, may be performed is between consecutive full back-ups, e.g., daily. An incremental back-up is a process whereby only data that has changed since the last back-up was executed (whether incremental or full) is backed-up. Typically, this changed data is backed-up on a file basis, even though frequently much of the data in the file has not changed. Thus, incremental back-ups are typically much smaller, and therefore much faster to accomplish, than are full back-ups. It is to be appreciated that although many environments typically execute full back-ups once a week and incremental back-ups daily during the week, there is no requirement that such time frames are used. For example, certain environments may require incremental back-ups several times a day. The principles of the invention apply to any environment using full back-ups (and optionally incremental back-ups), regardless of how often they are executed.

During a full back-up procedure, the host computer may create one or more virtual cartridges containing the backed-up data that comprises a plurality of data files. For clarity, the following discussion will assume that the full back-up generates only one virtual cartridge. However, it is to be appreciated that a full back-up may generate more than one virtual cartridge, and that the principles of the invention apply to any number of virtual cartridges.

According to one embodiment, there is provided a method for creating a synthetic full back-up data set from one existing full back-up data set and one or more incremental back-up data sets. This method may obviate the need to perform periodic (e.g., weekly) full back-ups, thereby saving the user considerable time and network resources. Furthermore, as known to those of skill in the art, restoring data based on a full back-up and one or more incremental back-ups can be a time consuming process because, for example, if the most recent version of a file exists in an incremental back-up, the back-up/restore application will typically restore the file based on the last full back-up and then apply any changes from the incremental back-ups. Providing a synthetic full back-up, therefore, may have an additional advantage of allowing the back-up restore application to more quickly restore data files based on the synthetic full back-up alone, without the need to perform multiple restores from a full back-up and one or more incremental back-ups. It is to be appreciated that the phrase "most recent version" as used herein refers generally to the most recent copy of a data file (i.e., the most recent time that the data file was saved), whether or not the file has a new version number. The term "version" is used generally herein to refer to copies of the same file which may be modified in some way or may have been saved multiple times.

Figure 7:
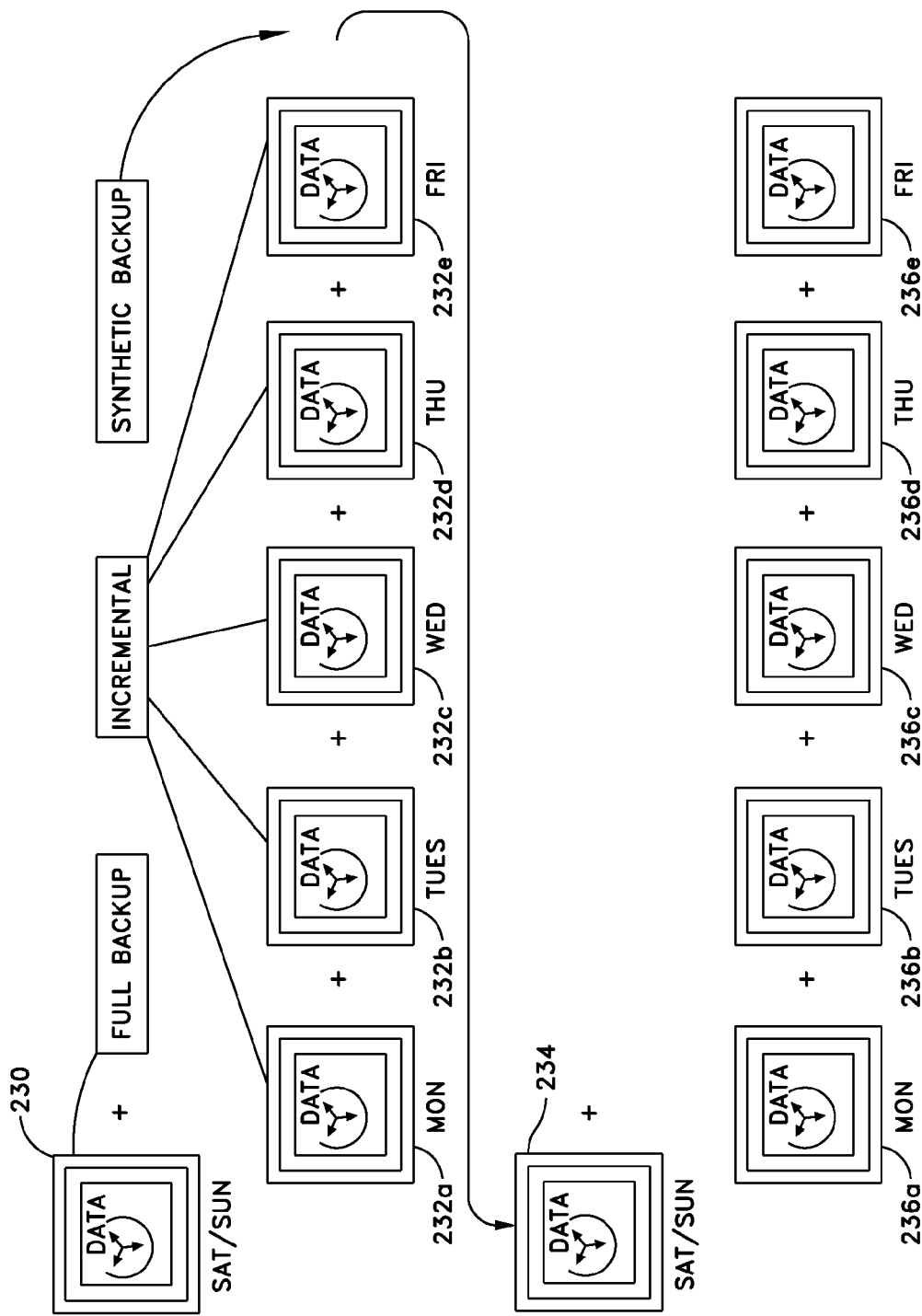
FIG. 7 is a diagram depicting one example of a method of creating a synthetic full back-up according to aspects of the invention.

Referring to FIG. 7, there is illustrated a schematic representation of a synthetic full back-up procedure. The host computer 120 may execute a full back-up 230 at a first moment in time, for example, on a weekend. The host computer 120 may then execute subsequent incremental back-ups 232*a*, 232*b*, 232*c*, 232*d*, 232*e*, for example, on each day during the week. The storage system 170 may then create a synthetic full back-up data set 234, as discussed below.

According to one embodiment, the storage system 170 may include a software application referred to herein as a synthetic full back-up application 240 (see FIG. 3). The synthetic full back-up application 240 may be run on the storage system controller 122 (see FIG. 2) or may be run on the host computer 120. The synthetic full back-up application includes software commands and interfaces necessary for creating the synthetic full back-up data set 234. In one example, the synthetic full back-up application may perform a logical merge of metadata representations of each of the full back-up data set 230 and the incremental back-up data sets 232 to generate a new virtual cartridge that contains the synthetic full back-up data set 234.

Figure 8:
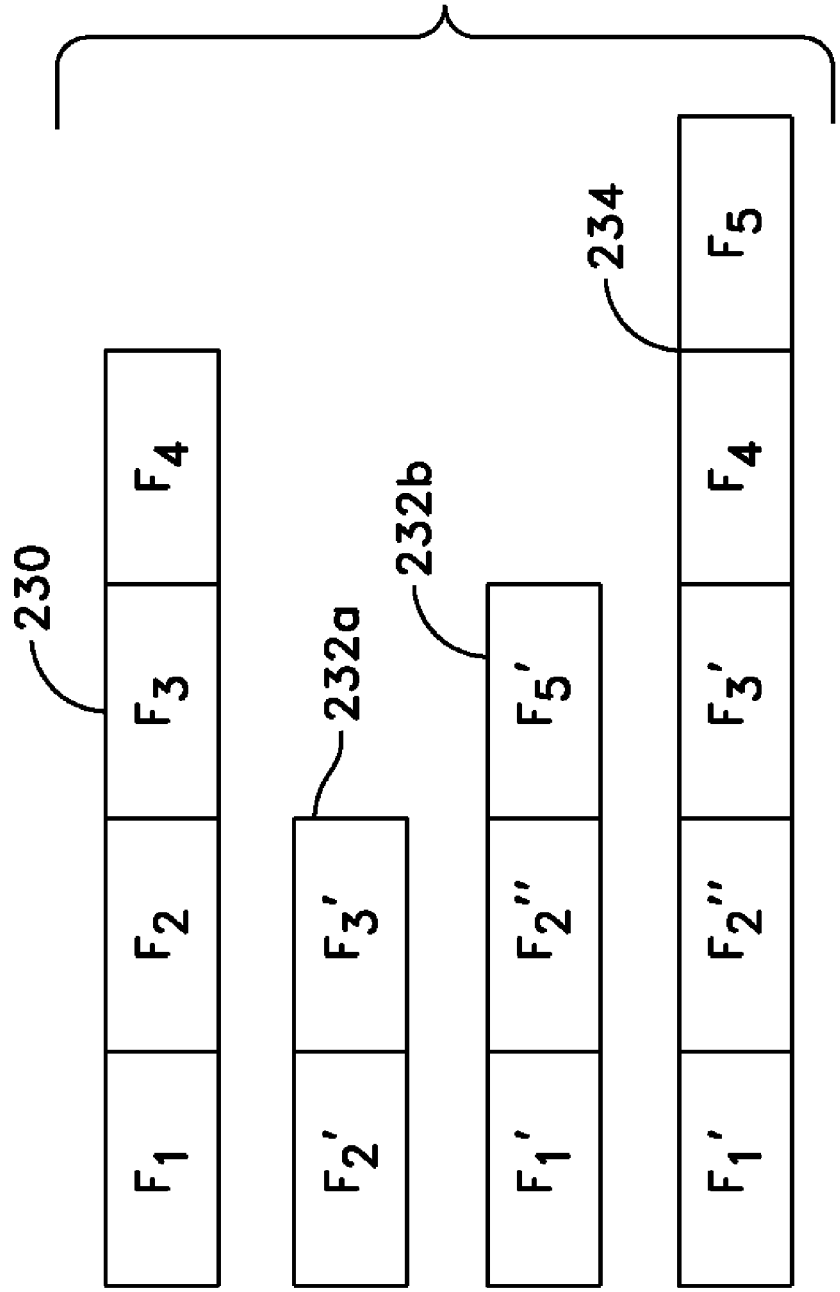
FIG. 8 is a schematic diagram of one example, of a series of back-up data sets including a synthetic full back-up according to aspects of the invention.

For example, referring to FIG. 8, the existing full back-up data set may include user files F1, F2, F3 and F4. A first incremental back-up data set 232*a* may include user files F2', a modified version of F2, and F3', a modified version of F. A second incremental back-up data set 232*b* may include user files F1', a modified version of F1, and F2'', a further modified version of F2, and a new user file F5. Therefore, the synthetic full back-up data set 234 formed from a logical merge of the full back-up data set 230 and the two incremental data sets 232*a* and 232*b*, contains the latest version of each of user files F1, F2, F3, F4 and F5. As seen in FIG. 8, the synthetic full back-up data set therefore contains user files F1', F2'', F3', F4 and F5.

Referring again to FIGS. 3 and 4, the file system software 146 may create a logical metadata cache 242 that stores metadata relating to each user file stored on the emulated media 134. It is to be appreciated that the logical metadata cache is not required to be a physical data cache, but may instead be a searchable collection of data stored on the storage media 126. In another example, the logical metadata cache 242 can be implemented as a database. Where the metadata is stored in a database, conventional database commands (e.g., SQL commands) can be used to perform the logical merge of the full back-up data set and the one or more incremental back-up data sets to create the synthetic full back-up data set.

Figure 9:
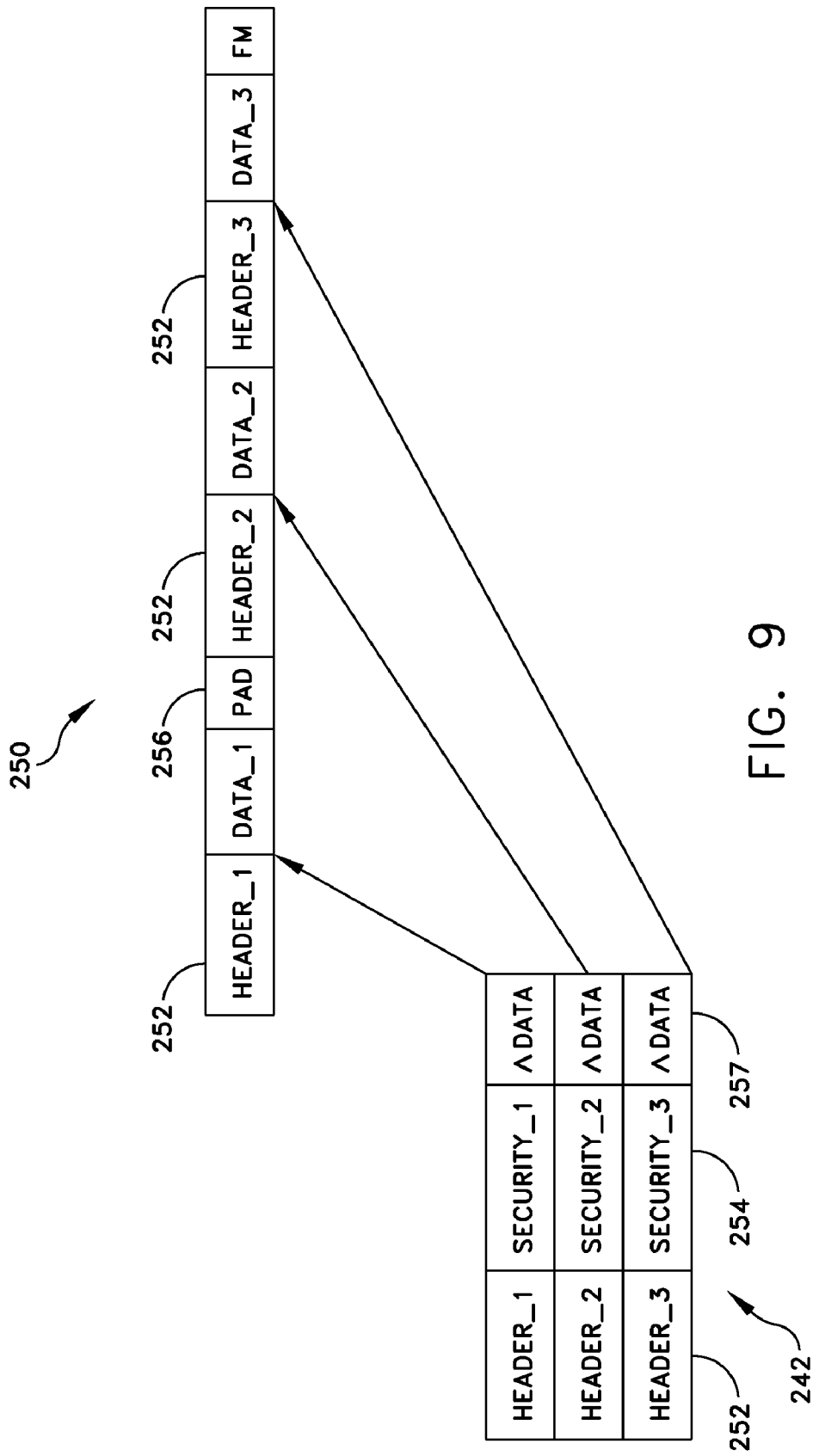
FIG. 9 is a diagram of one example, of a metadata cache structure.

As discussed above, each data file stored on the emulated media 134 may include a file descriptor that contains metadata relating to the data file, including a location of the file on the back-up storage media 126. In one embodiment, the back-up/restore application running on the host computer 120 stores data in a streaming tape format on the emulated media 134. An example of a data structure 250 representing this tape format is illustrated in FIG. 9. As discussed above, the system file data structure includes headers which may contain information about the data file(s), such as the file descriptor for the data files, the dates of creation and/or modification of the files, security information, the directory structure of the host system from whence the file(s) came, as well as other information linking the files to a virtual cartridge. These headers are associated with the data 254 which is actual user and system files that have been backed-up (copied) from the host computer, the primary storage system, etc. The system file data structure may also optionally include pads 256 which may appropriately align the next header to a block boundary.

As shown in FIG. 9, in one embodiment, the header data is located in the logical metadata cache 242 to permit rapid searching and random access to the otherwise sequential tape data format. The use of the logical metadata cache, implemented using the file system software 146 on the storage system controller 122, allows translation of the linear, sequential tape data format, stored on the emulated media 134, into the random-access data format stored on physical disks making up the back-up storage media 126. The logical metadata cache 242 stores the headers 252 which include the file descriptors for the data files, security information which may be used to control access to the data files, as is discussed in more detail below, and pointers 257 to the actual locations of the data files on the virtual cartridges and the back-up storage media 126. In one embodiment, the logical metadata cache stores Is data relating to all the data files backed-up in the full back-up data set 230 and each of the incremental data sets 232.

According to one embodiment, the synthetic full back-up application software 240 uses the information stored in the logical metadata cache to create a synthetic full back-up data set. This synthetic full back-up data set is then linked to a synthetic virtual cartridge, created by the synthetic full back-up application 240. To the back-up/restore application, the synthetic full back-up data set appears to be stored on this synthetic virtual cartridge. As discussed above, the synthetic full back-up data set may be created by performing a logical merge of the existing full back-up data set and the incremental back-up data sets. This logical merge may include comparing each of the data files included in each of the existing full back-up data set and the incremental back-up data sets and creating a composite of the latest-modified version of each user file, as discussed above in reference to FIG. 8.

Figure 10:
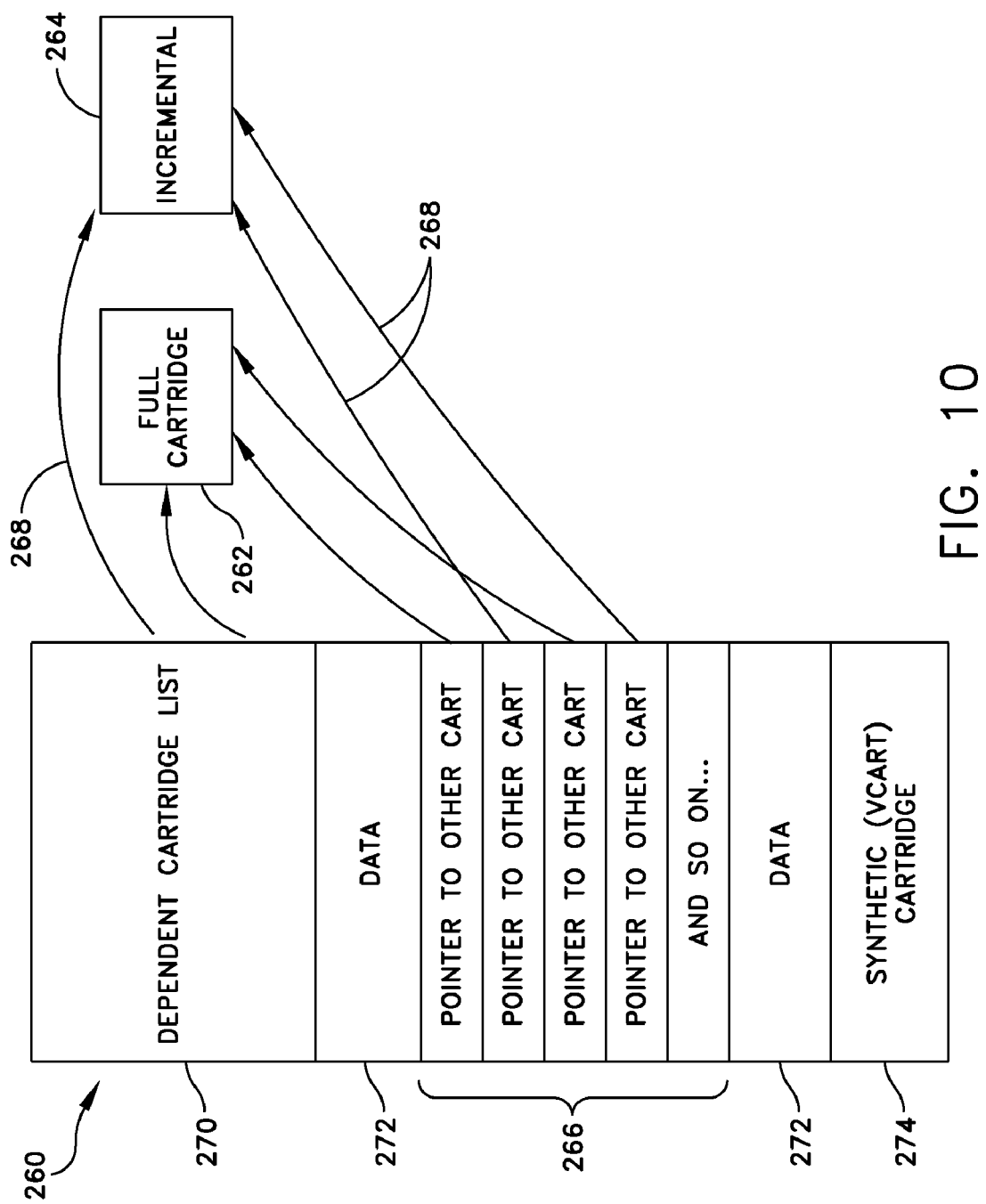
FIG. 10 is a diagram of one example of a virtual cartridge storing a synthetic full back-up data set.

According to one embodiment, the synthetic virtual cartridge 260 includes pointers that point to locations of data files on other virtual cartridges, specifically, the virtual cartridges that contain the existing full back-up data set and the incremental back-up data sets, as shown in FIG. 10. Considering the example given with respect to FIG. 8 above, the synthetic virtual cartridge 260 includes pointers 266 that point (indicated by arrows 268) to the locations in the existing full back-up data set, on virtual cartridge 262, of user file F4 (because the existing full back-up data set contained the latest version of F4) and to the location of, for example, user file F3' in incremental data set 232a on virtual cartridge 264.

The synthetic virtual cartridge also includes a list 270 that contains the identifying numbers (and optionally the names) of all the virtual cartridges that contain data to which the pointers 266 point. This dependent cartridge list 270 may be important for keeping track of where the actual data is and for preventing the dependent virtual cartridges from being erased. In this embodiment, the synthetic full back-up data set does not contain any actual user files, but rather a set of pointers that indicate the locations of the user files on the back-up storage media 126. Thus, a synthetic full back-up data set is provided that corresponds to the most recent copy of each user file based upon the set of pointers, without copying data from the most recent copy of each user file. Therefore, it may be desirable to prevent the actual user files (stored on other virtual cartridges) from being deleted. This may be accomplished in part by keeping a record (dependent cartridge list 270) of the virtual cartridges that contain the data and protecting each of those virtual cartridges from being over-written or deleted. The synthetic virtual cartridge may also include cartridge data 272 such as, the size of the synthetic virtual cartridge, its location on the back-up storage media 126, etc. In addition, the synthetic virtual cartridge may have an identifying number and/or name 274.

Figure 11:
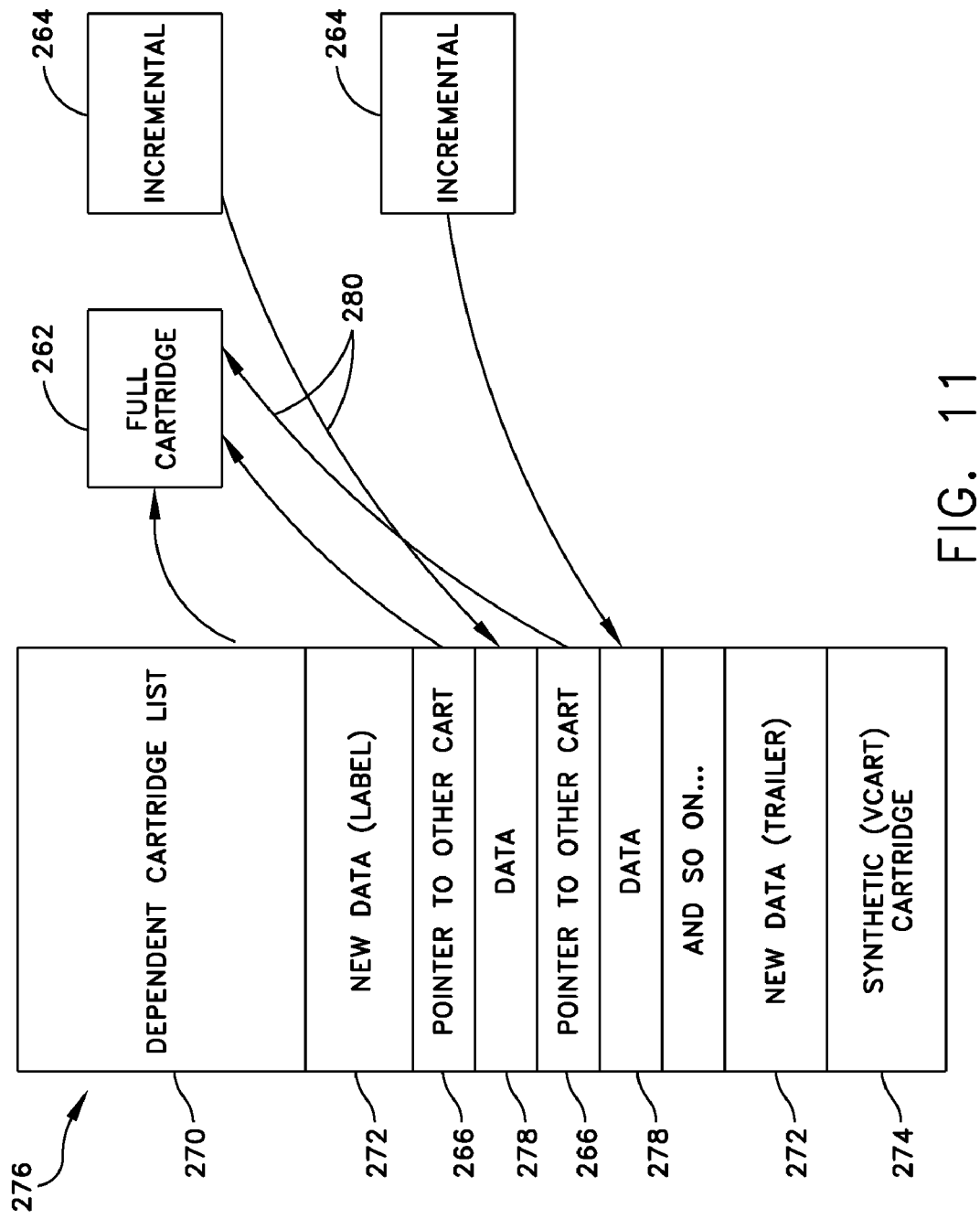
FIG. 11 is a diagram of another example of a virtual cartridge storing a synthetic full back-up data set.

According to another embodiment, the synthetic virtual cartridge may include a combination of pointers and actual stored user files. Referring to FIG. 11, in one example, the synthetic virtual cartridge includes pointers 266 that point to locations of data files (the latest versions, as discussed above in reference to FIG. 9) in the existing full back-up data set 230 on virtual cartridge 262. The synthetic virtual cartridge may also include data 278 containing actual data files copied from the incremental data sets 232, as indicated by arrows 280. In this manner, the incremental back-up data sets can be deleted after the synthetic full back-up data set 276 has been created, thereby saving storage space. The synthetic virtual cartridges are relatively small as they contain all or partly pointers rather than copies of all the user files.

It is to be appreciated that synthetic full back-ups may include any combination of pointers and stored file data and are not limited to the examples given above. For example, synthetic full back-ups may include pointers to data files for some files stored on certain incremental and/or full back-ups and may include stored file data copied from other existing full and/or incremental back-ups. Alternatively still, a synthetic full back-up may be created based upon a prior full back-up and any relevant incremental back-ups that does not include any pointers, but rather includes the latest version of actual file data copied from the appropriate full and/or incremental back-ups.

In one embodiment, the synthetic full back-up application software may include a differencing algorithm that enables it to compare the user and system file metadata for each of the existing full back-up data set and the incremental back-up data sets to determine where the latest version of each of the data files is located. For example, a differencing algorithm could be used to compare the dates of creation and/or modification, the version number (if applicable), etc. between different versions of the same data files in the different back-up sets to select the most recent version of the data file. However, users may often open a user file and save the file (thereby changing its data of modification) without actually changing any of the data inside the file. Therefore, the system may implement a more advanced differencing algorithm that may analyze the data inside the system or user files to determine whether the data has in fact changed. Variations of such differencing algorithms and other types of compare algorithms may be known to those skilled in the art. In addition, as discussed above, where the metadata is stored in a database format, database commands such as SQL commands can also be used to perform the logical merge. The invention may apply any of such algorithms to ensure that the most recent or latest version of each user file may be selected from all compared existing back-up sets so as to properly create the synthetic full back-up data set.

As should be appreciated by those skilled in the art, the synthetic full back-up application enables full back-up data sets to be created and made available without requiring the host computer to execute a physical full back-up. Not only does this avoid burdening the host computer with the processor overhead of transferring the data to the back-up storage system, but in embodiments where the synthetic full back-up application is executed on the storage system, it significantly reduces the utilization of network bandwidth. As illustrated in FIG. 7, further synthetic full back-up data sets may be created using a first synthetic full back-up data set 234 and subsequent incremental back-up data sets 236. This may provide a significant time advantage in that files or objects that are not frequently modified may not be frequently copied. Instead, the synthetic full back-up data sets may maintain pointers to these files that have just been copied once.

As discussed above in reference to FIG. 3, the storage system may also include a software application referred to as the end-user restore application 300. Thus, according to another embodiment, there is provided a method for end users to locate and restore back-up data without IT staff intervention and without requiring any changes to existing back-up/restore procedures and/or policies. In a typical back-up storage system, the back-up/restore application running on the host computer 120 is controlled by IT staff and it may be impossible or very difficult for an end-user to access backed-up data without intervention by the IT staff. According to aspects and embodiments of the invention, storage system software is provided that allows end users to locate and restore their files via, for example, a web-based or other interface with the back-up storage media 126.

It is to be appreciated that, as with the synthetic full back-up application 240, the end-user restore application 300 may be run on the storage system controller 122 (see FIG. 2) or may be run on the host computer 120. The end-user restore application includes software commands and interfaces necessary to allow an authorized user to search the logical metadata cache to locate, an optionally restore, backed-up files from the back-up storage media 126.

According to one embodiment, there is provided software including a user interface that is installed and/or executed on the user computer 136. The user interface may be any type of interface that allows a user to locate files on the back-up storage media. For example, the user interface may be a graphical user interface, may be web-based, or may be a text interface. The user computer is coupled to the storage system 170 via a network connection 138 which may be, for example, an Ethernet connection. Through this network connection 138, an operator of the user computer 136 can access the data stored on the storage system 170.

In one example, the end-user restore application 300 includes a user authentication and/or authorization feature. For example, a user may be asked to login via the user interface on the user computer using a username and password. The user computer may communicate the username and password to the storage system (e.g., to the end-user restore application) which may use an appropriate user authentication mechanism to determine whether the user has access to the storage system. Some examples of user authentication mechanisms that may be used include, but are not limited to, a Microsoft Active Directory server, a Unix "yellow pages" server or a Lightweight Directory Access Protocol. The login/user authentication mechanism may communicate with the end-user restore application to exchange the user privileges. For example, some users may be allowed to search only those files that have been created by themselves or for which they have certain privileges or are identified as an owner. Other users such as, for example, system operators or administrators may be allowed access to all backed-up files, etc.

According to one embodiment, the end-user restore application uses the logical metadata cache to obtain information about all the data files backed-up on the back-up storage media. The end-user restore application presents to the user, via the user interface, a hierarchical directory structure of the user's files sorted by, for example, back-up time/date, username, original user computer directory structure (that may have been obtained when the files were backed-up), or other file characteristics. In one example, the directory structure presented to the user may vary according to the privileges enabled for that user. The end-user restore application may accept browse requests (i.e., through the user interface, the user may browse the directory structure to locate a desired file) or the user may search for a file by name, date, etc.

According to one embodiment, the user may restore backed-up files from the storage system. For example, once the user has located a desired file, as described above, the user may download the file from the storage system via the network connection 138. In one example, this download procedure may be implemented in a manner comparable to any web-based download, as known to those skilled in the art.

By allowing end users to access those files for which they have permission to view/download, and by enabling such access through a user interface (e.g., web-based technology), the end-user restore application can enable user to search for and restore their own files without there being any need to alter any back-up policies or procedures.

It should be appreciated that although aspects of the present invention, such as the synthetic full back-up application and the end-user restore application are described herein primarily in terms of software, it should be appreciated that they may alternatively be implemented in software, hardware or firmware, or any combination thereof.

Thus, for example, embodiments of the present invention may comprise any computer-readable medium (e.g., a computer memory, a floppy disk, a compact disk, a tape, etc.) encoded with a computer program (i.e., a plurality of instructions), which, when executed, at least in part, on a processor of a storage system, performs the functions of the synthetic full back-up application and/or the end-user restore application as described in detail above.

In general summary, embodiments and aspects of the invention thus include a storage system and methods that emulate a conventional tape back-up system but may provide enhanced functionality such as being able to create synthetic back-ups and allowing end users to view and restore backed-up files. However, it should be appreciated that various aspects of the present invention may be used for other than the back-up of computer data. Because the storage system of the present invention may be used to economically store vast amounts of data, and that stored data can be accessed randomly, as opposed to sequentially, and at hard disk access times, embodiments of the present invention may find use outside of traditional back-up storage systems. For example, embodiments of the present invention may be used to store video or audio data representing a wide selection of movies and music and enable video and/or audio on demand.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A storage system comprising:
a first storage medium;
an interface configured to receive a data stream including a data object to be stored on the first storage medium; and
a controller configured to:
  extract metadata from the data stream, the metadata being descriptive of attributes of the data object, comprising creating metadata that links a portion of the data object to a corresponding virtual cartridge, wherein the one or more corresponding virtual cartridges emulate physical tape cartridges; and
  direct the extracted metadata to be stored on a computer-readable medium as a system file including:
    (i) a header comprising the metadata, the header including a tape directory that contains the metadata that links the portion of the data object to its corresponding virtual cartridge; and
    (ii) data including the portion of the data object.

2. The storage system according to claim 1, wherein the computer-readable medium includes a cache of memory.

3. The storage system according to claim 1, wherein the computer-readable medium includes the first storage medium.

4. The storage system according to claim 1, wherein the computer-readable medium includes a second storage medium.

5. The system according to claim 1, wherein the controller is further configured to arrange extracted metadata into a searchable cache.

6. The system according to claim 5, wherein the searchable cache comprises a database and at least one file referenced in the database.

7. A non-transitory computer-readable medium comprising instructions that, as a result of being executed by a processor, instruct the processor to perform a method, the method comprising:

receiving a data stream to be stored on a first storage system, the data stream comprising a data object and metadata that describes attributes of the data object;

extracting the metadata from the data stream, comprising creating metadata that links a portion of the data object to a corresponding virtual cartridge, wherein the one or more corresponding virtual cartridges emulate physical tape cartridges;

storing the data object on the first storage system as a system file including:
(i) a header comprising the extracted metadata, the header including a tape directory that contains the metadata that links the portion of the data object to its corresponding virtual cartridge; and
(ii) data including the portion of the data object.

8. A computer-implemented method comprising:
receiving, by a computer, a data stream including objects to be stored on a backup storage system;
acquiring, by the computer, metadata descriptive of attributes of the objects, comprising creating metadata that links a portion of the data object to a corresponding virtual cartridge, wherein the one or more corresponding virtual cartridges emulate physical tape cartridges; and
storing, by the computer, the acquired metadata on the backup storage system as a system file including:
(i) a header comprising the metadata, the header including a tape directory that contains the metadata that links the portion of the data object to its corresponding virtual cartridge; and
(ii) data including the portion of the data object.

9. A computer-implemented method comprising:
receiving, by a computer, a data stream to be stored on a first storage system, the data stream comprising a data object and metadata that describes attributes of the data object;
extracting, by the computer, the metadata from the data stream, comprising creating metadata that links a portion of the data object to a corresponding virtual cartridge, wherein the one or more corresponding virtual cartridges emulate physical tape cartridges;
storing, by the computer, the data object on the first storage system as a system file including:
(i) a header comprising the metadata, the header including a tape directory that contains the metadata that links the portion of the data object to its corresponding virtual cartridge; and
(ii) data including the portion of the data object.

10. The method according to claim 9, wherein receiving a data stream comprises receiving a data stream to be stored on a backup storage system.

11. The method according to claim 9, wherein storing the extracted metadata comprises storing the extracted metadata in a searchable cache.

12. The method according to claim 11, wherein storing the extracted metadata in a searchable cache comprises storing the extracted metadata in a database.

13. The method according to claim 9, wherein extracting the metadata from the data stream comprises extracting the metadata from the data stream during the step of receiving the data stream.

14. The method according to claim 9, wherein storing the extracted metadata comprises storing the extracted metadata in a cache of memory.

15. The method according to claim 9, wherein storing the extracted metadata comprises storing the extracted metadata on the first storage system.

16. The method according to claim 9, wherein storing the extracted metadata comprises storing the extracted metadata on a second storage system.

17. The method according to claim 9, wherein receiving the data stream comprises receiving the data stream from a primary storage system via any one of a backup/restore application, an archiving application or a data migration application.

18. The method according to claim 9, wherein extracting the metadata comprises extracting a modification history of the data object.

19. The method according to claim 9, wherein extracting the metadata comprises extracting security data associated with the data object.

20. The method according to claim 19, wherein extracting the security data comprises extracting at least one identifier of a user authorized to access the data object associated with the security data.

21. The method according to claim 9, wherein extracting the metadata comprises extracting a storage location on a primary storage system of the data object.

22. The method according to claim 9, wherein extracting the metadata comprises extracting a backup volume associated with the data object.

23. The method according to claim 9, wherein extracting the metadata comprises extracting a size of the data object.

24. The method according to claim 9, wherein extracting the metadata comprises extracting an identifier of a software application associated with the data object.

25. The method according to claim 9, wherein extracting the metadata comprises extracting a file name.

26. The method according to claim 9, wherein extracting the metadata comprises extracting a host server name.

27. The method according to claim 9, wherein extracting the metadata comprises extracting metadata created by an application transmitting the data stream.

28. The method according to claim 9, wherein storing the data object comprises storing a file.

29. The method according to claim 9, wherein storing the data object comprises storing a block of data.

30. The method of claim 9, wherein the tape directory comprises one or more file markers, wherein the one or more file markers:
do not represent any data;
are not stored in the data section of the system file; and
are used by the virtual cartridge to emulate a tape cartridge.

31. The method of claim 30, wherein the portion of the data object is a user file, a system file, or both.

32. A computer-implemented method comprising:
receiving, by a computer, a data stream to be stored on a first storage system, the data stream comprising a data object and metadata that describes attributes of the data object;
storing, by the computer, the data stream on the first storage system as a system file including:
(i) a header comprising the metadata, the header including a tape directory that contains metadata that links a portion of the data object to a corresponding virtual cartridge; and
(ii) data including the portion of the data object; and
extracting, by the computer, the metadata from the data stream, comprising creating the metadata that links the portion of the data object to a corresponding virtual cartridge, wherein the one or more corresponding virtual cartridges emulate physical tape cartridges.

33. The method according to claim 32, wherein receiving a data stream comprises receiving a data stream to be stored on a backup storage system.

34. The method according to claim 32, wherein storing the extracted metadata comprises storing the extracted metadata in a cache of memory.

35. The method according to claim 32, wherein storing the extracted metadata comprises storing the extracted metadata on the first storage system.

36. The method according to claim 32, wherein storing the extracted metadata comprises storing the extracted metadata on a second storage system.

37. The method according to claim 32, wherein extracting the metadata from the data stream is performed after storing the data stream on the backup storage system.

38. The method according to claim 32, wherein extracting the metadata from the data stream is performed while storing the data stream on the backup storage system.

39. The method according to claim 32, wherein extracting the metadata from the data stream is performed before storing the data stream on the backup storage system.

* * * * *